(No Model.)

O. SIMPSON.
HARVESTER.

No. 256,751. Patented Apr. 18, 1882.

UNITED STATES PATENT OFFICE.

ORIN SIMPSON, OF TAMPICO, INDIANA.

HARVESTER.

SPECIFICATION forming part of Letters Patent No. 256,751, dated April 18, 1882.

Application filed September 3, 1881. (No model.)

*To all whom it may concern:*

Be it known that I, ORIN SIMPSON, of Tampico, in the county of Howard and State of Indiana, have invented a new and useful Improvement in Harvesters, of which the following is a full, clear, and exact specification.

Reference is to be had to the accompanying drawings, forming part of this specification, in which similar letters of reference indicate corresponding parts in all the figures.

Figure 1:
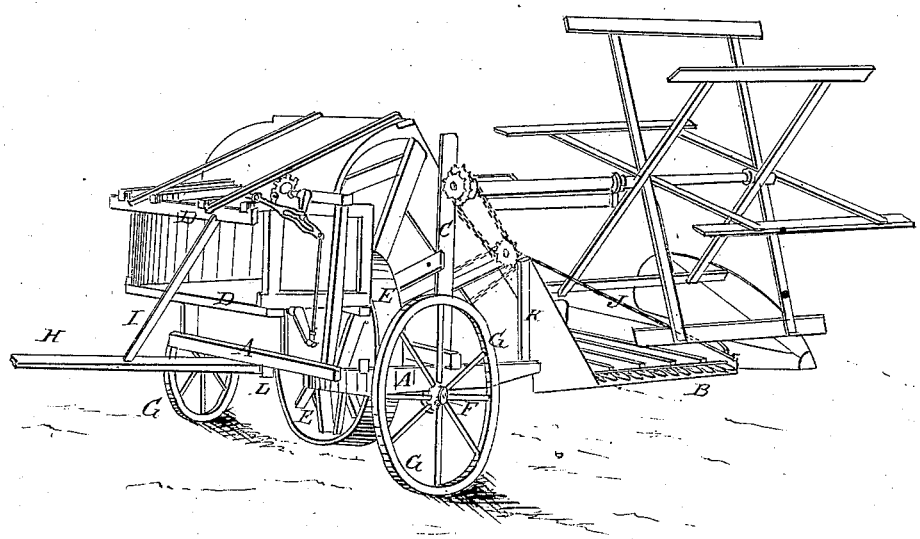
Figure 2:
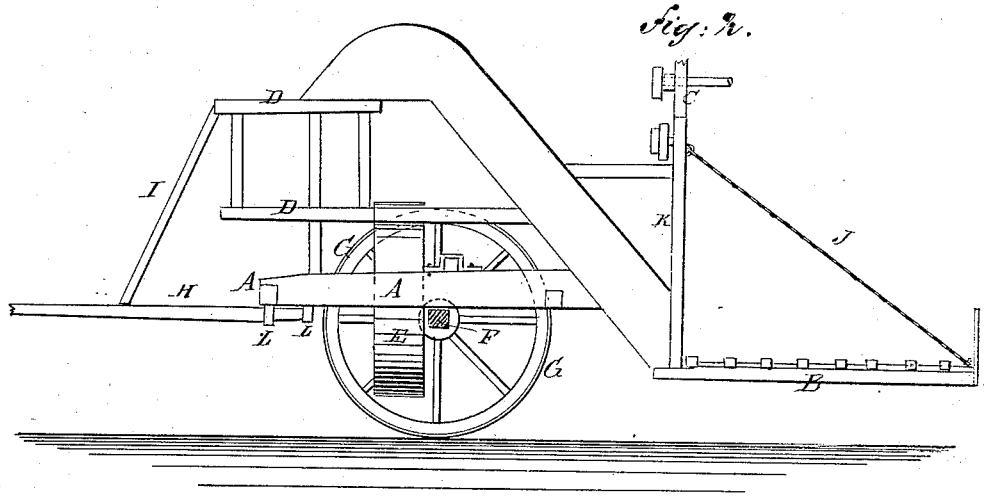

Figure 1 is a perspective view of a harvester to which my improvement has been applied. Fig. 2 is an elevation of the same, partly in section.

The object of this invention is to facilitate the moving of harvesters from place to place.

A represents the frame of the harvester. B is the cutter-bar, C the reel-post, D the binder-frame, and E the drive-wheel, all of which parts are constructed in the ordinary manner.

F represents an axle of sufficient length to cross the harvester, and of such a size as to readily support the said harvester.

G are wheels which are placed upon the journals of the axle F, so that the operator can raise the drive-wheel E when the axle F is placed beneath the frame A so far above the ground as to pass over ordinary obstructions. The axle F is placed beneath the frame A at the inner side of the drive-wheel E, and can be secured in place by bolts, clamps, or other suitable means.

H is the tongue, which is detached from its ordinary place, and is inserted in extra tongue-fastenings L, attached to the inner side girt of the frame A. With this improvement, when the harvester is to be drawn from place to place the draft is applied in the direction of the longest dimension of the harvester, so that the harvester can readily pass along narrow roads and through narrow passages, where it could not pass if drawn upon its drive-wheels in the ordinary manner. When the machine is to be moved the tongue H is strengthened in place by a brace-bar, I, the lower end of which is attached to the said tongue, and its upper end is attached to the top bar of the binder-frame D.

To the outer part of the cutter-bar B is attached the outer end of a chain, J, the inner end of which is attached to the reel-post C or to its supporting-frame K. The chain J thus strengthens the cutter-bar when raised from the ground.

With this improvement, when the harvester is to be taken from one place to another the operator takes hold of the outer end of the cutter-bar B and raises it until the binder-frame D rests upon the ground. The tongue H is detached and the truck G G F is placed beneath the harvester at the inner side of the drive-wheel E. The outer side of the harvester is then raised by taking hold of the binder-frame D, and the machine will be balanced upon the truck G G F. The drive-wheel is then raised to pass over obstructions, and the tongue H is secured to fastening L, attached to the inner side girt of the frame A, and the grain-wheel is detached. The brace I and the chain J are then attached when required, and the machine is ready to be moved.

Having thus fully described my invention, I claim as new and desire to secure by Letters Patent—

The combination, with a harvester, of the axle F and the wheels G G, arranged substantially as described, the tongue H, attached to the outer side girt of frame A, the brace-bar I, attached at its lower end to the tongue and at its upper end to the binder-frame D, and the chain J, attached to the cutter-bar and reel-post, as and for the purpose specified.

ORIN SIMPSON.

Witnesses:
GEORGE INGELS, Jr.,
J. B. SKINNER.